Dec. 14, 1937. F. C. KOLLATH Re. 20,585

ELECTRIC SOCKET AND CASING

Original Filed March 17, 1930

Inventor:
Francis C. Kollath,
By Cheever, Cox & Moore
Attys

Reissued Dec. 14, 1937

Re. 20,585

UNITED STATES PATENT OFFICE 20,585

ELECTRIC SOCKET AND CASING

Francis C. Kollath, Chicago, Ill., assignor of one-half to Daniel Woodhead, Evanston, Ill.

Original No. 2,018,134, dated October 22, 1935, Serial No. 436,289, March 17, 1930. Application for reissue May 8, 1936, Serial No. 78,725

11 Claims. (Cl. 173—358)

This invention relates to an electric socket and particularly to an electric socket provided with means which interfittingly engage a socket guard or casing.

The primary object of the invention is to provide a socket which has new and novel means for connecting a strain relief member thereto, and which has new and improved terminals arranged thereon.

Another object is to provide a new and improved socket which is provided with means for interfittingly engaging a socket guard or casing.

A further object is to provide a casing of improved construction which is provided with means for interfittingly receiving a strain relief member on a socket.

A still further object is to provide an improved strain relief member which is secured to the body of a socket by elements which act as contactors or terminals.

It is an additional object of the present invention to provide a new and improved type of rubber encased electrical connector in which the contactor elements will not twist loose in the casing during use.

Numerous other objects and advantages will be apparent throughout the progress of the following specification.

The invention comprises in general a socket member having a relatively flat member which is made of insulating material and which is connected to the body of the socket by the terminals to which electrical contact is made with the socket. The member is provided with outwardly extending projections which are received in grooves in a flexible rubber guard or casing. The projections on the member provide shoulders which engage shoulders inside of the rubber guard or casing.

The accompanying drawing illustrates a selected embodiment of the invention and the views therein are as follows.

Figure 1:
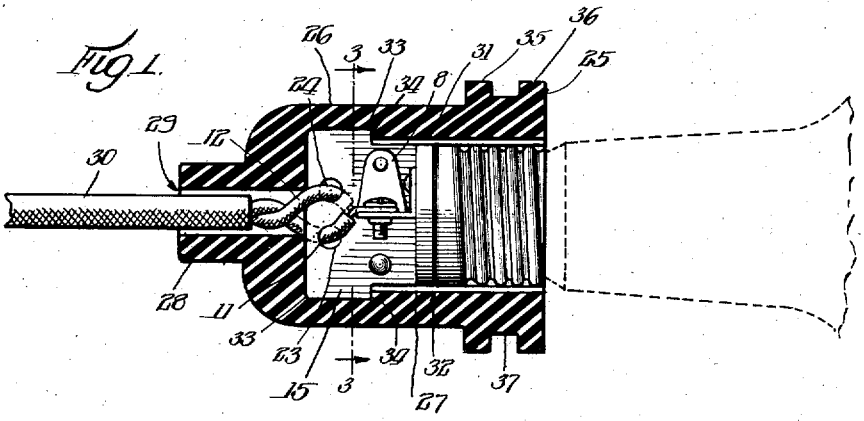
Fig. 1 is a detail elevation showing the improved socket arranged in its cooperating guard or casing and showing conductors electrically connected thereto.

Referring to the drawing, 5 designates generally a socket member having the usual screw threaded shell 6. This shell is rigidly connected to an insulated disk 7 to which a pair of terminals 8, 8 are attached and which are elctrically connected with the socket in the usual manner. These terminals 8 each comprise a main body portion 9 into which a screw member 10 threadedly engages for securing the conductors 11 and 12 to the terminals. A base portion 13 which is integral with the body 9 is bent over from the body portion and is rigidly connected to the disk 7. A wing portion 14 which is integral with the body portion 9 is bent at right angles to the body portion and is rigidly connected to the member 15. Each terminal 8 therefore comprises a portion which is attached to the socket member, a portion which is attached to the member 15, and a body portion to which an electrical connection is made with a conductor.

The member 15 is made of insulating material and comprises a base portion 16 which is adapted to rest against the outer face of the disk 7. This member 15 is fastened to the socket by means of the terminals 8 which were previously described. Projections 17 and 18 extend from the sides 19 and 20 respectively of the member 15 and provide shoulders 21 and 22. Holes 23 and 24 may be provided in the member to receive the conductors 11 and 12 respectively. The conductors straddle the member 15, the conductor 12 passing over one side of the member 15, through the hole 24 and then connected to a terminal 8 on one side of the member 15, while the conductor 11 passes over the other side of the member 15, through the hole 23 and connected to the terminal 8 on the side opposite to which the conductor 12 is connected to its cooperating terminal 8.

The socket together with the member 15 is adapted to be inserted within a flexible rubber casing or guard 25. This guard 25 has an enlarged portion 26 having an enlarged recess 27 and a portion 28 which is provided with a passage 29 which communicates with the recess 27. The socket 5 is adapted to be received in the recess 27 and the conductors 11 and 12 which are encased in a single sheath 30, extend through the passage 29 and make electrical connection with the contacts after the conductors pass through the holes 23 and 24. By passing the conductors through the holes on opposite sides as previously set forth, any strain applied on the cable 30 will not be transmitted to the terminals but will be taken up by the member 15 where the conductors pass through the holes 23 and 24.

Figure 2:
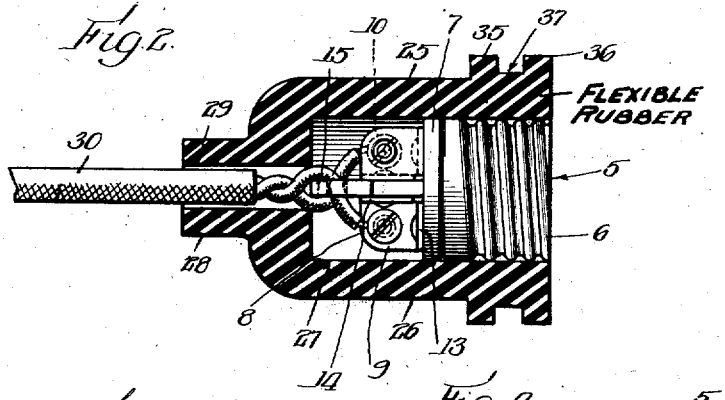
Fig. 2 is a similar view at right angles to the view shown in Fig. 1.
Figure 3:
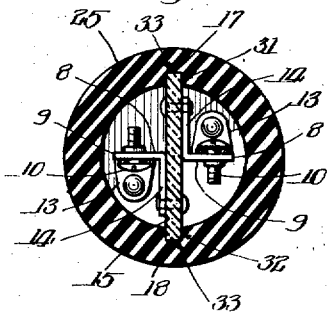
Fig. 3 is a detail sectional view on the line 3—3 of Fig. 1.
Figure 4:
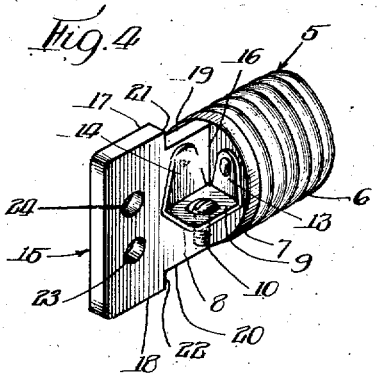
Fig. 4 is a detail perspective view of the improved socket and member.

The casing or guard 25 is provided with oppositely alined longitudinal slots or grooves 31 and 32. These slots or grooves are deepened or enlarged at 33 to provide shoulders 34. These shoulders are adapted to engage the shoulders 21 and 22 on the member 15 to prevent the socket from falling out of the casing or guard. The casing or guard is preferably made of flexible rubber which expands or flexes sufficiently to permit the projections 17 and 18 on the member 15 to be slid through the slots or grooves 31 and 32. When the socket is finally inserted in position, the projections 17 and 18 will engage the sides of the slots or grooves where they are deepened as indicated at 33. The flexibility of the casing permits it to spring back to normal position and engage or hug the sides of the member 15 as clearly shown in Figs. 1 and 2. The shoulders 21 and 22 on the member 15 engage the shoulders 34 in the casing to prevent the socket from being withdrawn accidentally from the casing, but the flexibility of the rubber permits the socket to be withdrawn from the casing if and when it is desired to remove it. The guard 25 may also be provided with exterior annular flanges 35 and 36 to provide an annular groove 37 into which the clamping ring of a shade or lamp guard (not shown) may be received. The flat member 15 engaging the grooves in the casing prevents the socket or any of its parts from turning in the casing even when a lamp or plug is screwed in the socket.

The invention provides a socket which is comparatively simple in construction and which may be readily and economically manufactured. The member 15 not only acts as a strain relief to take up any strain which may be exerted on the conductors, but it also assists in holding the socket member in its cooperating casing. The casing is provided with a groove into which the member 15 may be slid, and the cooperating shoulders on the casing and the shoulders on the member 15 securely hold the socket in position and prevent the shell from accidental movement in the assembly. This member of course may be positioned variously with respect to the body of the shell. The terminals are preferably made in one piece from a sheet of brass material. The terminals not only provide means for making an electrical connection between the conductors and the socket, but also perform the function of holding the member 15 and the socket together.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. In combination, a flexible rubber open-ended casing having alined grooves extending from the margin of the opening, said grooves merging with deeper grooves and providing shoulders, a flat base in said casing and engaging said grooves, said base having projections received in said deeper grooves, said projections providing shoulders engaging the first shoulders and holding the base in position.

2. In combination a flexible rubber open-ended casing having alined grooves extending from the margin of the opening, said grooves merging with deeper grooves and providing shoulders, a flat base in said casing and engaging said grooves, said base having projections received in said deeper grooves, said projections providing shoulders engaging the first shoulders and holding the base in position, contacts fastened to each side of the base and electric terminals connected to said contacts.

3. A connector comprising a flexible casing made of flexible rubber-like material, a shell of a predetermined diameter arranged in the casing, a flat base connected to the shell, a part of said base being of a width greater than the diameter of the shell and forming shoulders, said casing having grooves therein forming shoulders and being stretchable within limits for holding the base in position in the casing, the shoulders of the base locking with the shoulders of the casing.

4. A connector comprising a shell of a predetermined diameter, a flat base connected to the shell, a part of said base being of a greater width than the diameter of the shell, a flexible rubber casing receiving the connector, and shoulders on the inside of the casing and engaging the said part of the base for holding the connector in place inside of the casing, said casing having aligned grooves therein to receive the said part of said base.

5. A connector comprising a shell of a predetermined diameter, a flat base connected to the shell, a part of said base being of a greater width than the diameter of the shell, a flexible rubber casing receiving the connector, and shoulders on the inside of the casing and engaging the said part of the base for holding the connector in place inside of the casing, said casing having aligned grooves therein to receive the said part of said base, said grooves forming said shoulders which engage the said part of said base.

6. An electric connector comprising a soft flexible casing made of rubber-like material and having an opening therein, said casing having opposite grooves in its inner wall extending from the margin of the opening and having shoulders intermediate their lengths, a base arranged in said casing and having extensions extending into the grooves, the extensions forming shoulders engaging the first named shoulders for locking the base in the casing, and electric connector means fastened to the base, said casing being stretchable within certain limits to permit insertion or removal of said base.

7. An electric connector comprising a base, a disk connected to the base, a shell engaging the disk, a contact member perpendicular to the disk, an integral base portion bent from the contact and fastened to the disk, and a wing bent from a side of the contact member and fastened to the base.

8. A connector comprising a casing having an opening therein, a disk arranged in the opening of the casing, a base plate connected to and extending substantially normal to the disk, said base plate and casing having interfitting means to secure the base plate to the casing, and terminals secured to said base plate and disk.

9. A connector comprising a casing having an opening therein, a disk arranged in the opening of the casing, a base plate connected to and extending substantially normal to the disk, said base plate and casing having interfitting means to secure the base plate to the casing, and terminal means connected to said base plate and to the disk to relatively brace the disk and base plate.

10. In an article of the class described, an electrical lamp socket having a generally cylindrical configuration, a flexible open-ended rubber casing having an internal substantially cylindrical space formed therein to accommodate and support the socket, a groove formed on the interior side wall of the casing and extending in a direction parallel to the axis of said cylindrical socket, a guide groove extending longitudinally from said first mentioned groove toward the open end of the casing, a projecting shoulder rigidly formed on the socket and extending a substantial distance outwardly of the cylindrical confines thereof, said shoulder engaging in said first mentioned groove, said casing being stretchable within certain limits to permit removal and insertion of the socket.

11. In an article of the class described, an electrical connector comprising a conducting shell of generally cylindrical configuration, a flexible open-ended casing of rubber-like material having an interior cylindrical space therein relatively closely accommodating said shell for support thereof, a groove formed on the interior side wall of said casing and extending in a direction parallel to the axis of said cylindrical shell, a projecting shoulder rigidly formed on the shell and extending a substantial distance outwardly of the cylindrical confines thereof, said shoulder engaging in said groove, the said groove being provided with a shoulder intermediate of said first named shoulder and said open end of the casing, said second named shoulder extending axially inwardly beyond said first named shoulder to retain the socket axially within the casing, and a guide groove extending longitudinally from said first named groove toward the open end of the casing.

FRANCIS C. KOLLATH.